(12) United States Patent
Shimada et al.

(10) Patent No.: US 11,835,756 B2
(45) Date of Patent: Dec. 5, 2023

(54) OPTICAL FIBER WITH PRIMARY AND SECONDARY COATING LAYERS

(71) Applicant: SUMITOMO ELECTRIC INDUSTRIES, LTD., Osaka (JP)

(72) Inventors: Kensaku Shimada, Osaka (JP); Kazuyuki Sohma, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 400 days.

(21) Appl. No.: 17/289,948

(22) PCT Filed: Nov. 8, 2019

(86) PCT No.: PCT/JP2019/043992
§ 371 (c)(1),
(2) Date: Apr. 29, 2021

(87) PCT Pub. No.: WO2020/096055
PCT Pub. Date: May 14, 2020

(65) Prior Publication Data
US 2022/0011504 A1    Jan. 13, 2022

(30) Foreign Application Priority Data

Nov. 9, 2018   (JP) ................................ 2018-211163

(51) Int. Cl.
*G02B 6/02*       (2006.01)
*C03C 25/1065*   (2018.01)
*C03C 25/326*    (2018.01)

(52) U.S. Cl.
CPC ...... *G02B 6/02395* (2013.01); *C03C 25/1065* (2013.01); *C03C 25/326* (2013.01)

(58) Field of Classification Search
CPC ........................ G02B 6/02395; C03C 25/1065
See application file for complete search history.

(56) References Cited

U.S. PATENT DOCUMENTS 4,778,244 A    10/1988   Ryan
5,146,531 A *  9/1992   Shustack ............. C03C 25/1065
                                                     522/42

(Continued)

FOREIGN PATENT DOCUMENTS

CA    2153581 A1    8/1994
DE    43 02 327 A1  8/1994

(Continued)

*Primary Examiner* — Michael Stahl
(74) *Attorney, Agent, or Firm* — Faegre Drinker Biddle & Reath LLP

(57) ABSTRACT

An optical fiber comprises a glass fiber comprising a core and a cladding; and a coating resin layer coating the glass fiber, wherein the coating resin layer has a primary resin layer in contact with the glass fiber and coating the glass fiber and a secondary resin layer coating the outer periphery of the primary resin layer, the primary resin layer has a Young's modulus of 0.4 MPa or less at 23° C. and the primary resin layer has an outer diameter of 185 μm or more and 202 μm or less, the secondary resin layer has a glass transition temperature of 60° C. or more and 95° C. or less, and the difference between the average linear expansion coefficient of the coating resin layer in the range of 60° C. to 140° C. and the average linear expansion coefficient of the coating resin layer in the range of −60° C. to 0° C. is $0.7 \times 10^{-4}/°$ C. or less.

12 Claims, 1 Drawing Sheet

(56) References Cited

U.S. PATENT DOCUMENTS

| | | | |
|---|---|---|---|
| 6,215,931 B1 | 4/2001 | Risch et al. | |
| 2004/0022510 A1* | 2/2004 | Suzuki | G02B 6/4403 |
| | | | 385/128 |
| 2007/0258687 A1* | 11/2007 | Yamamoto | C09D 175/16 |
| | | | 106/31.27 |
| 2011/0188822 A1* | 8/2011 | Konstadinidis | C03C 25/1065 |
| | | | 427/163.2 |
| 2012/0321265 A1* | 12/2012 | Terruzzi | G02B 6/02395 |
| | | | 385/128 |
| 2013/0266281 A1 | 10/2013 | Tanaka et al. | |
| 2016/0047977 A1 | 2/2016 | Sohma et al. | |
| 2017/0003446 A1 | 1/2017 | Homma | |
| 2018/0095221 A1* | 4/2018 | Homma | C03C 25/1065 |
| 2018/0128970 A1* | 5/2018 | Homma | C08G 18/4825 |

FOREIGN PATENT DOCUMENTS

| | | |
|---|---|---|
| EP | 1 004 551 A1 | 5/2000 |
| EP | 1 065 181 A2 | 1/2001 |
| EP | 1 930 381 A1 | 6/2008 |
| JP | S60-012522 A | 1/1985 |
| JP | H06-003299 A | 1/1994 |
| JP | 2000-221370 A | 8/2000 |
| JP | 2000-241680 A | 9/2000 |
| JP | 2001-240433 A | 9/2001 |
| JP | 2001-328851 A | 11/2001 |
| JP | 2009-198945 A | 9/2009 |
| JP | 2012-113091 A | 6/2012 |
| JP | 2016-040216 A | 3/2016 |
| WO | WO-99/31161 A1 | 6/1999 |
| WO | WO-01/05724 A2 | 1/2001 |

\* cited by examiner

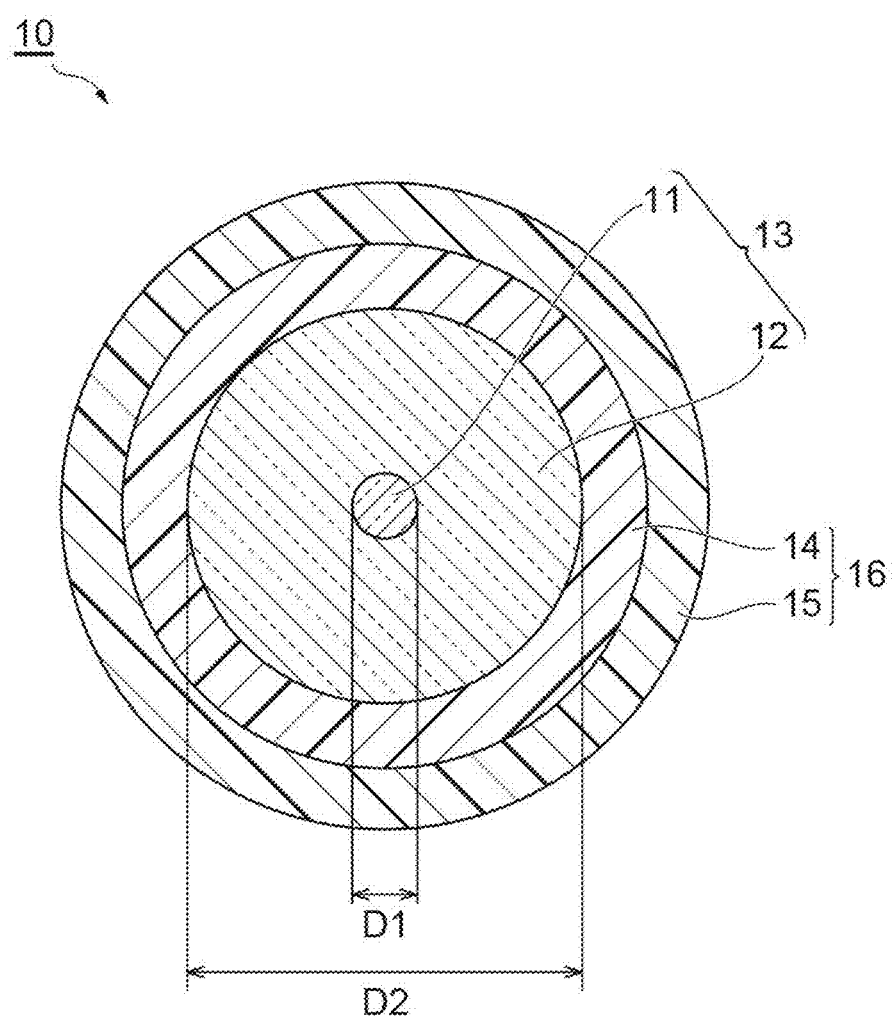

OPTICAL FIBER WITH PRIMARY AND SECONDARY COATING LAYERS

TECHNICAL FIELD

The present invention relates to an optical fiber.

The present application claims priority based on Japanese Patent Application No. 2018-211163 filed on Nov. 9, 2018, and incorporates all the contents described in the Japanese patent application.

BACKGROUND ART

In general, an optical fiber has a coating resin layer for protecting a glass fiber as optical transmission medium. The coating resin layer is composed of, for example, two layers including a primary resin layer and a secondary resin layer.

Recently, in order to increase the transmission capacity of an optical fiber, the effective core cross-sectional area tends to be increased. For example, the effectiveness of use of an optical fiber having an enlarged effective core cross-sectional area for preventing signal deterioration that occurs along with increase in the transmission capacity is described in Patent Literature 1. However, it is known that with increase in the effective core cross-sectional area, the transmission loss (microbending loss) induced by minute bending by lateral pressure applied to the optical fiber increases. In order to reduce the microbending loss, an optical fiber is required to have excellent lateral pressure characteristics. For example, effectiveness of reduction in Young's modulus of the primary resin layer for improvement in the lateral pressure characteristics of an optical fiber is described in Patent Literature 2.

CITATION LIST

Patent Literature

Patent Literature 1: JP 2009-198945 A
Patent Literature 2: JP 2016-40216 A

SUMMARY OF INVENTION

An optical fiber in an aspect of the present disclosure comprises: a glass fiber comprising a core and a cladding; and a coating resin layer coating the glass fiber, wherein the coating resin layer has a primary resin layer in contact with the glass fiber and coating the glass fiber and a secondary resin layer coating the outer periphery of the primary resin layer, the primary resin layer has a Young's modulus of 0.4 MPa or less at 23° C. and the primary resin layer has an outer diameter of 185 μm or more and 202 μm or less, the secondary resin layer has a glass transition temperature of 60° C. or more and 95° C. or less, and the difference between the average linear expansion coefficient of the coating resin layer in the range of 60° C. to 140° C. and the average linear expansion coefficient of the coating resin layer in the range of −60° C. to 0° C. is $0.7 \times 10^{-4}$/° C. or less.

BRIEF DESCRIPTION OF DRAWING

FIG. 1 is a schematic cross-sectional view showing an example of the optical fiber in the present embodiment.

DESCRIPTION OF EMBODIMENTS

Problem to be Solved by the Present Disclosure

From the viewpoint of improving the lateral pressure characteristics of an optical fiber, although it is desirable to reduce the Young's modulus of the primary resin layer, the primary resin layer is deformed during manufacturing of the optical fiber with reduction in the Young's modulus of the primary resin layer, so that uniformity of the optical fiber is reduced. In such a case, the productivity of the optical fiber is reduced due to appearance defects resulting from color unevenness occurring in formation of a colored layer on the outer periphery of the coating resin layer for identifying the optical fiber. In addition, with reduction in the Young's modulus of the primary resin layer, peeling may occur due to deformation of the coating during a screening test, and in that case, the transmission loss of the optical fiber increases at low temperature where the primary resin layer easily contracts.

An object of the present disclosure is to provide an optical fiber with excellent uniformity, having no increase in transmission loss under low temperature environment, in spite of having excellent lateral pressure characteristics with a low Young's modulus.

Effects of the Present Disclosure

According to the present disclosure, an optical fiber with excellent uniformity, having no increase in transmission loss under low temperature environment, in spite of having excellent lateral pressure characteristics with a low Young's modulus can be provided.

Description of Embodiment of the Present Disclosure

First, the embodiments of the present disclosure are listed and described. The optical fiber in an aspect of the present disclosure comprises: a glass fiber comprising a core and a cladding; and a coating resin layer coating the glass fiber, wherein the coating resin layer has a primary resin layer in contact with the glass fiber and coating the glass fiber and a secondary resin layer coating the outer periphery of the primary resin layer. The Young's modulus of the primary resin layer is 0.4 MPa or less at 23° C., and the outer diameter of the primary resin layer is 185 μm or more and 202 μm or less. The glass transition temperature of the secondary resin layer is 60° C. or more and 95° C. or less, and the difference between the average linear expansion coefficient of the coating resin layer in the range of 60° C. to 140° C. and the average linear expansion coefficient of the coating resin layer in the range of −60° C. to 0° C. is $0.7 \times 10^{-4}$/° C. or less.

By reducing the Young's modulus of the primary resin layer, the lateral pressure applied to the glass fiber is reduced, so that the lateral pressure characteristic of an optical fiber can be improved. Further, by setting the outer diameter of the primary resin layer within the range, the primary resin layer is difficult to be deformed, and contraction at low temperature can be reduced. Further, by controlling the glass transition temperature (Tg) of the secondary resin layer in the range, and reducing the difference between the average linear expansion coefficient of the coating resin layer in the range of 60° C. to 140° C. and the average linear expansion coefficient of the coating resin layer in the range of −60° C. to 0° C. (hereinafter referred to simply as "difference in linear expansion coefficient" in some cases), the residual stress generated in the primary resin layer is reduced, so that no peeling occurs during a screening test, and increase in the transmission loss under low temperature environment can be eliminated.

From the viewpoint of lowering the Young's modulus of the primary resin layer, the primary resin layer may include a cured product of a resin composition containing a urethane oligomer, a monomer and a photopolymerization initiator, and the resin composition may contain 40 mass % or more of a one-end non-reactive oligomer based on the total amount of the urethane oligomer.

From the viewpoint of increasing the transmission capacity of an optical fiber, the effective core cross-sectional area of glass fiber of the optical fiber may be 110 µm² or more and 170 µm² or less.

From the viewpoint of further improving the lateral pressure characteristics of an optical fiber and further increasing the transmission capacity, the Young's modulus of the primary resin layer at 23° C. may be 0.3 MPa or less, and the effective core cross-sectional area of the glass fiber may be 140 µm² or more and 170 µm² or less.

In order to identify an optical fiber, the optical fiber of the present embodiment may further include a colored layer coating the outer periphery of the secondary resin layer.

Details of Embodiment of the Present Disclosure

A specific example of the optical fiber in an embodiment of the present disclosure is described with reference to drawing on an as needed basis. It is intended that the present invention is shown by the scope of claims without limited to the exemplifications, and include equivalents to the scope of the claims and all the modification within the scope. In the following description, the same reference numerals are given to the same elements in the description of drawing, and redundant description is omitted.

(Optical Fiber)

FIG. 1 is a schematic cross-sectional view showing an example of the optical fiber according to the present embodiment. The optical fiber 10 comprises the glass fiber 13 including the core 11 and the cladding 12, and the coating resin layer 16 including the primary resin layer 14 and the secondary resin layer 15 provided on the outer periphery of the glass fiber 13.

The cladding 12 surrounds the core 11. The core 11 and the cladding 12 mainly include glass such as silica glass, germanium-added silica glass can be used, for example, in the core 11, and pure silica glass or fluorine-added silica glass can be used in the cladding 12.

In FIG. 1, for example, the outer diameter (D2) of the glass fiber 13 is about 125 µm. From the viewpoint of increasing the transmission capacity of an optical fiber, the effective core cross-sectional area of the glass fiber 13 is preferably 110 µm² or more and 170 µm² or less, more preferably 130 µm² or more and 170 µm² or less, still more preferably 140 µm² or more and 170 µm² or less.

The thickness of the coating resin layer 16 is usually about 55 µm to 75 µm. The thickness of each of the primary resin layer 14 and the secondary resin layer 15 may be about 10 µm to 50 µm, and, for example, the thickness of the primary resin layer 14 may be 35 µm and the thickness of the secondary resin layer 15 may be 25 µm. The outer diameter of the optical fiber 10 may be about 235 µm to 275 µm.

In the case where the outer diameter of the primary resin layer is small, the lateral pressure characteristics tend to deteriorate, and in the case where the outer diameter of the primary resin layer is large, the coating resin layer is easily deformed. From the viewpoint of improving the lateral pressure characteristic of the optical fiber 10, the outer diameter of the primary resin layer 14 is 185 µm or more, or may be 190 µm or more. From the viewpoint of improving the uniformity of the optical fiber 10, the outer diameter of the primary resin layer 14 is 202 µm or less, or may be 200 µm or less.

In the case where the Young's modulus of the primary resin layer is large, the lateral pressure applied to the glass fiber increases. From the viewpoint of improving the lateral pressure characteristics, the Young's modulus of the primary resin layer 14 at 23° C. is 0.4 MPa or less, preferably 0.35 MPa or less, more preferably 0.3 MPa or less. The lower limit of the Young's modulus of the primary resin layer 14 is not particularly limited, and from the viewpoint of suppressing the increase in transmission loss under low temperature environment, the lower limit at 23° C. is preferably 0.03 MPa or more, more preferably 0.04 MPa or more, still more preferably 0.05 MPa or more. The Young's modulus of the primary resin layer 14 can be measured for the optical fiber 10 at 23° C., for example, by the Pullout Modulus test disclosed in JP 2001-328851 A. The Young's modulus of the primary resin layer 14 can be adjusted by the content of a one-end non-reactive oligomer, the curing conditions of the resin composition, etc.

In the case where Tg of the secondary resin layer exceeds 95° C., the residual stress of the primary resin layer increases, so that the primary resin layer peels off from the glass fiber in screening test. In other words, peeling occurs, so that the transmission loss at low temperature increases. The screening test is a step of applying a tension of, for example, 1.5 kg or 2.2 kg or more to the entire length of an optical fiber to remove a low-strength portion. In the step, when the optical fiber is sandwiched between a belt and a pulley, the coating resin layer of the optical fiber is deformed. The deforming stress plus the residual stress applied to the primary resin layer may cause peeling in some cases. From the viewpoint of suppressing increase in the transmission loss under low temperature environment, Tg of the secondary resin layer 15 is 60° C. or more and 95° C. or less, preferably 65° C. or more and 95° C. or less, more preferably 70° C. or more and 90° C. or less. The Tg of the secondary resin layer 15 can be adjusted by the content of the urethane oligomer, the concentration of urethane bonds in the urethane oligomer, the type of monomer, the curing conditions of the resin composition, etc.

The larger the difference in linear expansion coefficient in the coating resin layer, the larger the residual stress in the primary resin layer, and the transmission loss at low temperatures may increase as described above. From the viewpoint of suppressing the increase in transmission loss under low temperature environment, the difference in linear expansion coefficient is $0.7 \times 10^{-4}/°$ C. or less, preferably $0.65 \times 10^{-4}/°$ C. or less, more preferably $0.6 \times 10^{-4}/°$ C. or less. The difference in linear expansion coefficient can be adjusted by the concentration of urethane bonds in a urethane oligomer, the type of monomer, the curing conditions of the resin composition, etc.

The primary resin layer 14 and the secondary resin layer 15 can be formed, for example, by curing an ultraviolet-curable resin composition including a urethane oligomer, a monomer and a photopolymerization initiator (hereinafter, referred to simply as "resin composition" in some cases).

As the urethane oligomer, an oligomer obtained by reacting a polyol compound, a polyisocyanate compound and a hydroxyl group-containing (meth)acrylate compound can be used.

Examples of the polyol compound include polytetramethylene glycol, polypropylene glycol, and bisphenol A/ethylene oxide addition diol. Examples of the polyisocyanate compound include 2,4-tolylene diisocyanate, 2,6-tolylene diisocyanate, isophorone diisocyanate, and dicyclohexylmethane-4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate. The number average molecular weight (Mn) of the polyol compound may be 300 or more and 3000 or less.

As a catalyst for synthesizing urethane oligomers, an organotin compound is generally used. Examples of the organotin compound include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. From the viewpoint of easy availability or catalytic performance, it is preferable to use dibutyltin dilaurate or dibutyltin diacetate as the catalyst.

A monohydric alcohol may be used for synthesizing urethane oligomers. Examples of the monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

In the case where a urethane oligomer is prepared by reacting a polyol, a polyisocyanate, a hydroxyl group-containing (meth)acrylate and a monohydric alcohol, the urethane oligomer may contain the following reaction products (A), (B) and (C):

(A): H-PI-(PO-PI)$_n$-R
(B): H-PI-(PO-PI)$_n$-H
(C): R-PI-(PO-PI)$_n$-R wherein H represents a hydroxyl group-containing (meth)acrylate residue, PI represents a polyisocyanate residue, PO represents a polyol residue, and R represents a monohydric alcohol residue. A part of R may be a residue of water contained as impurity. Besides, n represents an integer of 1 or more.

The reaction product (A) is a one-end non-reactive oligomer with a (meth)acryloyl group at one end and an alkoxy group at another end. The one-end non-reactive oligomer is a reaction product of a polyol, a polyisocyanate, a hydroxyl group-containing (meth)acrylate, and a monohydric alcohol (or water). The one-end non-reactive oligomer has an effect of lowering the crosslink density of a cured product, capable of reducing the Young's modulus.

The reaction product (B) is a both-ends reactive oligomer with (meth)acryloyl groups at both ends. The both-ends reactive oligomer is a reaction product of a polyol, a polyisocyanate and a hydroxyl group-containing (meth)acrylate. The both-ends reactive oligomer can increase the crosslink density of a cured product. The reaction product (C) has an effect of lowering Young's modulus.

It is preferable that the urethane oligomer contained in the resin composition for the primary resin layer contain a one-end non-reactive oligomer. From the viewpoint of lowering the Young's modulus of the primary resin layer, the resin composition contains preferably 40 mass % or more, more preferably 50 mass % or more, still more preferably 60 mass % or more, of a one-end non-reactive oligomer, based on the total amount of the urethane oligomer.

As the urethane oligomer contained in the resin composition for the secondary resin layer, use of a urethane oligomer obtained by reacting a polyol, a polyisocyanate and a hydroxyl group-containing (meth)acrylate is preferred. From the viewpoint of reducing Tg of the secondary resin layer, it is preferable that more oligomers having n of 2 or more in the reaction products (A) and (B) be contained.

As the monomer, a monofunctional monomer having one polymerizable group or a polyfunctional monomer having two or more polymerizable groups can be used. The monomer may be used as a mixture of two or more types.

Examples of the monofunctional monomer include a (meth)acrylate-based monomer such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxy polyethylene glycol (meth)acrylate, and isobornyl (meth)acrylate; a carboxyl group-containing monomer such as (meth)acrylic acid, (meth)acrylic acid dimer, carboxyethyl (meth)acrylate, carboxypentyl (meth)acrylate, and ω-carboxy-polycaprolactone (meth)acrylate; a heterocyclic ring-containing (meth)acrylates such as N-acryloylmorpholine, N-vinylpyrrolidone, N-vinylcaprolactam, N-acryloylpiperidine, N-methacryloylpiperidine, N-acryloylpyrrolidine, 3-(3-pyridine)propyl (meth)acrylate, and cyclic trimethylolpropane formal acrylate; a maleimide-based monomer such as maleimide, N-cyclohexylmaleimide, and N-phenylmaleimide; an N-substituted amide-based monomer such as (meth)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; an aminoalkyl (meth)acrylate-based monomer such as aminoethyl (meth)acrylate, aminopropyl (meth)acrylate, N,N-dimethylaminoethyl (meth)acrylate, and tert-butylaminoethyl (meth)acrylate; and a succinimide-based monomer such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, EO adduct of bisphenol A di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)

acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl]isocyanurate.

The resin composition for the secondary resin layer contains di(meth)acrylate having a bisphenol A skeleton as polyfunctional monomer, so that a secondary resin layer having excellent surface curability can be easily formed. With a high surface curability, the secondary resin layer is difficult to be deformed during winding of an optical fiber, and the occurrence of color unevenness in the formation of a colored layer on the outer periphery of the secondary resin layer is easily reduced.

The photopolymerization initiator for use may be appropriately selected from known radical photopolymerization initiators. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentylphosphine oxide, 2-methyl-1-[4-(methylthio)phenyl]-2-morpholino-propane-1-one (Omnirad 907, manufactured by IGM Resins, B.V.), 2,4,6-trimethylbenzoyl diphenylphosphine oxide (Omnirad TPO, manufactured by IGM Resins, B.V.), and bis(2,4,6-trimethylbenzoyl)phenylphosphine oxide (Omnirad 819, manufactured by IGM Resins, B.V.).

The resin composition for the secondary resin layer contains a photopolymerization initiator such as 1-hydroxycyclohexyl phenyl ketone, which generates radicals difficult to be subject to oxygen curing inhibition, so that a secondary resin layer having excellent surface curability can be easily formed, and the surface friction coefficient of the optical fiber can be reduced. In the case where the surface friction coefficient of an optical fiber is large, the optical fiber may ride up a roller during winding of the optical fiber, and the optical fiber bends during falling from the riding position. As a result, the optical fiber is wound around a bobbin in a bent state with an extra length. The optical fiber is further wound on the upper layer, so that the coating resin layer is deformed. This increases the frequency of occurrence of color unevenness in formation of a colored layer on the outer periphery of the secondary resin layer. In order to prevent such a phenomenon, it is effective to add a photopolymerization initiator having excellent surface curability.

The resin composition may further contain an epoxy (meth)acrylate in order to adjust Tg of the secondary resin layer. As the epoxy (meth)acrylate, an oligomer obtained by reacting an epoxy resin having two or more glycidyl groups with a compound having a (meth)acryloyl group may be used.

The resin composition may further contain a silane coupling agent, a photo acid generator, a leveling agent, a defoaming agent, an antioxidant, etc.

The silane coupling agent is not particularly limited as long as it does not hinder the curing of the resin composition. By adding a silane coupling agent to the resin composition for a primary resin layer, the adhesion of the primary resin layer to a glass fiber can be improved.

Examples of the silane coupling agent include tetramethyl silicate, tetraethyl silicate, mercaptopropyl trimethoxysilane, vinyltrichlorosilane, vinyltriethoxysilane, vinyltris((3-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyl trimethoxysilane, γ-glycidoxypropylmethyl diethoxysilane, γ-methacryloxypropyl trimethoxysilane, N-(β-aminoethyl)-γ-aminopropyl trimethoxysilane, N-(β-aminoethyl)-γ-aminopropyltrimethyl dimethoxysilane, N-phenyl-γ-aminopropyl trimethoxysilane, γ-chloropropyl trimethoxysilane, γ-mercaptopropyl trimethoxysilane, γ-aminopropyl trimethoxysilane, bis-[3-(triethoxysilyl)propyl]tetrasulfide, bis-[3-(triethoxysilyl)propyl]disulfide, γ-trimethoxysilylpropyl dimethylthiocarbamyl tetrasulfide, and γ-trimethoxysilylpropyl benzothiazyl tetrasulfide.

An onium salt having a structure of $A^+B^-$ may be used as a photoacid generator. Examples of the photo acid generator include a sulfonium salt such as UVACURE 1590 (manufactured by DAICEL-CYTEC Co., Ltd.) and CPI-100P and 110P (manufactured by San-Apro Ltd.), and an iodonium salt such as Omnicat 250 (manufactured by IGM Resins, B.V.), WPI-113 (manufactured by FUJIFILM Wako Pure Chemical Corporation), and Rp-2074 (manufactured by Rhodia Japan, Ltd.).

An antistatic agent may be added to the resin composition for the secondary resin layer. Examples of the antistatic agent include a low molecular-type antistatic agent such as a nonionic-based glycerol fatty acid ester, an anionic-based alkylsulfonate, and a cationic-based tetraalkylammonium salt, and a polymer-type antistatic agent such as a polyether ester amide-type and a quaternary ammonium base-containing acrylate polymer-type.

As a method of forming the coating resin layer 16 on the glass fiber 13, a method conventionally used for manufacturing an optical fiber may be applied.

The optical fiber 10 of the present embodiment can be manufactured by applying a resin composition to the outer periphery of the glass fiber 13 and then irradiating the applied resin composition with ultraviolet rays for curing to thereby form the coating resin layer 16. On this occasion, a method (wet-on-dry method) including the successive steps of applying a resin composition for the primary resin layer to the outer periphery of the glass fiber 13, curing the composition by irradiation with ultraviolet rays to form the primary resin layer 14, applying the resin composition for the secondary resin layer on the periphery of the primary resin layer 14, curing the composition by irradiation with ultraviolet rays to form the secondary resin layer 15 may be used. Alternatively, a method (wet-on-wet method) including the successive steps of applying a resin composition for the primary resin layer to the outer periphery of the glass fiber 13, applying a resin composition for the secondary resin layer to the periphery of the glass fiber 13, and forming the primary resin layer 14 and the secondary resin layer 15 through simultaneous curing by irradiation of ultraviolet rays may be used.

A colored layer as ink layer for identifying the optical fiber may be formed on the outer peripheral surface of the secondary resin layer 15 that constitutes the coating resin layer 16. It is preferable that the colored layer contain a pigment from the viewpoint of improving the identification of the optical fiber. Examples of the pigment include color pigments such as carbon black, titanium oxide and zinc white, magnetic powders such as $\gamma\text{-}Fe_2O_3$, mixed crystals of $\gamma\text{-}Fe_2O_3$ and $\gamma\text{-}Fe_3O_4$, $CrO_2$, cobalt ferrite, cobalt-coated iron oxide, barium ferrite, Fe—Co and Fe—Co-Ni, and an inorganic pigment such as MIO, zinc chromate, strontium chromate, aluminum tripolyphosphate, zinc, alumina, glass and mica. Alternatively, an organic pigment such as an azo pigment, a phthalocyanine-based pigment and a dyeing lake pigment may be used. The pigment may be subject to treatment such as various kinds of surface modification and composite pigmentation.

EXAMPLES

Hereinafter, the results of evaluation tests in Examples and Comparative Examples of the present disclosure are shown, and the present disclosure is described in more detail. The present invention, however, is not limited to these Examples.

[Urethane Oligomer]

Synthesis Example 1

Using a polypropylene glycol having an Mn of 2000 as polyol, isophorone diisocyanate as polyisocyanate, 2-hydroxyethyl acrylate as hydroxyl group-containing (meth)acrylate compound, methanol as monohydric alcohol, methoquinone as polymerization inhibitor, and dibutyltin dilaurate as catalyst, a reaction was performed to synthesize a urethane oligomer. The Mn of the urethane oligomer was 4500, and the content of a one-end non-reactive oligomer in the urethane oligomer was 100 mass %.

Synthesis Example 2

A urethane oligomer with a content of a one-end non-reactive oligomer of 60 mass % and a content of a both-ends reactive oligomer of 40 mass % was synthesized in the same manner as in Synthesis Example 1, except that the amounts of 2-hydroxyethyl acrylate and methanol compounded were changed.

Synthesis Example 3

A urethane oligomer with a content of a one-end non-reactive oligomer of 30 mass % and a content of a both-ends reactive oligomer of 70 mass % was synthesized in the same manner as in Synthesis Example 1, except that the amounts of 2-hydroxyethyl acrylate and methanol compounded were changed.

[Resin Composition for Primary Resin Layer]
(Resin Composition P1)

By mixing 65 parts by mass of the urethane oligomer in Synthesis Example 1 as oligomer, 5.5 parts by mass of nonylphenol EO-modified acrylate, 20.5 parts by mass of isobornyl acrylate, and 7.0 parts by mass of N-vinylcaprolactam as monomers, 1.2 parts by mass of 2,4,6-trimethylbenzoyl diphenylphosphine oxide as photopolymerization initiator, 0.8 parts by mass of Irganox 1035 (manufactured by BASF Japan Ltd.) as antioxidant, and 0.15 parts by mass of 2-hydroxy-4-methoxybenzophenone as light stabilizer, a resin composition P1 was obtained.
(Resin Composition P2)

A resin composition P2 was obtained in the same manner as in the preparation of the resin composition P1, except that the oligomer was changed to the urethane oligomer in Synthesis Example 2.
(Resin composition P3)

A resin composition P3 was obtained in the same manner as in the preparation of the resin composition P1, except that the oligomer was changed to the urethane oligomer in Synthesis Example 3.

[Resin Composition for Secondary Resin Layer]

A urethane oligomer that is a reaction product of a polypropylene glycol having an Mn of 1000, toluene diisocyanate and 2-hydroxyethyl acrylate, and an epoxy acrylate as oligomer, isobornyl acrylate, trimethylolpropane triacrylate, and EO-modified bisphenol A diacrylate (Biscoat #700) as monomers, and 2,4,6-trimethylbenzoyldiphenylphosphine oxide and 1-hydroxycyclohexyl phenyl ketone as photopolymerization initiators were mixed at a predetermined ratio to prepare each of the resin compositions used in Examples and Comparative Examples.

[Resin Composition for Colored Layer]

A resin composition C was prepared by mixing 75 parts by mass of a urethane oligomer that is a reaction product of a polypropylene glycol having an Mn of 1000, 2,4-tolylene diisocyanate and 2-hydroxyethyl acrylate as oligomer, 10 parts by mass of a bisphenol A/ethylene oxide addition diol diacrylate as monomer, 3 parts by mass of 1-hydroxycyclohexan-1-yl phenyl ketone as photopolymerization initiator, 0.2 mass % of copper phthalocyanine as pigment relative to the total amount of the resin composition, and 3 mass % of titanium oxide relative to the total amount of the resin composition.

[Optical Fiber]

A glass fiber composed of a core and a cladding, having an outer diameter (D2) of 125 μm, and an effective core cross-sectional area of 150 μm$^2$ or 165 μm$^2$, was used. The glass fiber in Examples and Comparative Examples was prepared by forming a primary resin layer made of a resin composition for the primary resin layer on the outer periphery of the glass fiber and further forming a secondary resin layer made of a resin composition for the secondary resin layer on the outer periphery thereof. The outer diameter of the secondary resin layer was controlled to 245 μm. The following evaluation on the optical fiber prepared was performed. The results are shown in Table 1 and Table 2.

(Young's Modulus of Primary Resin Layer)

The Young's modulus of the primary resin layer was measured by the pullout module test at 23° C. Specifically, an incision was made in the resin coating layer of an optical fiber with a razor or the like to cut the resin coating layer, and the glass fiber was pulled out with the coating resin layer (primary resin layer and secondary resin layer) fixed. The Young's modulus of the primary resin layer was obtained from the amount of elastic deformation of the primary resin layer and the force of pulling the glass fiber before pulling out of the glass fiber.

(Tg of Secondary Resin Layer)

Ultrasonic waves were applied to an optical fiber immersed in a mixed solution of acetone and ethanol heated to about 50° C., and the glass fiber was pulled out to remove a pipe-shaped coating resin layer. The pipe-shaped coating resin layer was vacuum dried at 60° C. for 30 minutes, and then left standing at room temperature for 3 days to make a sample of coating resin layer for the measurement of Tg. Using "RSA G2 Solids Analyzer" manufactured by TA Instruments, the dynamic viscoelasticity of the coating resin layer was measured under conditions with a frequency: 11 Hz, strain: 0.1%, temperature rising rate: 5° C./min, and temperature range: room temperature to 150° C. The measured peak top temperature of tan δ was presumed as Tg of the secondary resin layer.

(Linear Expansion Coefficient)

A coating resin layer removed in the same manner as in the measurement of Tg was used as the sample for measuring linear expansion coefficient. The linear expansion coefficient of the coating resin layer was measured under the following conditions using a thermomechanical analyzer ("TMA 4000S" manufactured by Bruker AXS). The data at temperature T was measured from T to T+10° C. at 1° C. increment, averaged, and calculated as data at intervals of 10° C. In the following temperature range, 3-cycle measurement was performed to calculate the difference in linear expansion coefficient from the average value in the temperature range in the three cycles. The average linear expansion coefficient in the range of 60° C. to 140° C. is the average value of 27 data for 9 temperatures by 3 cycles, and the average linear expansion coefficient in the range of −60° C. to 0° C. is the average value of 21 data for 7 temperatures by 3 cycles.

Temperature range: −100° C. to 150° C.
Temperature rising rate: 5° C./min
Atmosphere: Air
Measurement length: approximately 15 mm
Measurement mode: tensile method
Tension: 0.015 N (Transmission Characteristics at Low Temperature)

A tension of 2.2 kg was applied to the optical fiber using a capstan device and a roller. The optical fiber with the tension applied was subject to measurement of the transmission characteristics of signals having a wavelength of 1550 nm under temperature conditions at 23° C. and −40° C., respectively. The difference between the transmission loss at −40° C. and the transmission loss at 23° C. (transmission loss difference) was calculated. The evaluation was ranked as "A" for a transmission loss difference of less than 0 dB/km, "B" for 0 dB/km or more and less than 0.010 dB/km, and "C" for 0.010 dB/km or more.

(Lateral Pressure Characteristics)

The transmission loss difference was calculated by subtracting the transmission loss of an optical fiber rolled into a loose bundle without wound around a bobbin from the transmission loss of the optical fiber wound around a bobbin wound with a flat-wound metal mesh with an outer diameter of 50 μm and a pitch of 150 μm. The evaluation was ranked as "A" for a transmission loss difference of less than 0.3 dB/km, "B" for 0.3 dB/km or more and less than 0.6 dB/km, and "C" for 0.6 dB/km or more.

(Uniformity)

After once winding up of an optical fiber, an optical fiber having a colored layer was prepared by forming a colored layer having a thickness of 5 μm made of the resin composition C around the outer periphery of the secondary resin layer while reeling out the optical fiber again by a coloring machine. The uniformity of the optical fiber was inspected by applying laser light from periphery of the optical fiber and monitoring the reflected light. In the case of occurrence of color unevenness, an abnormality is detected, and the yields decreases with increase in the frequency of abnormality detection. The evaluation was ranked as "A" for an abnormality detection number of 0 to 5/1000 km, "B" for 6 to 10/1000 km, and "C" for 11 or more/1000 km.

TABLE 1

| | | Example | | | | | | | | |
|---|---|---|---|---|---|---|---|---|---|---|
| | | 1 | 2 | 3 | 4 | 5 | 6 | 7 | 8 | 9 |
| | Effective core cross-sectional area (μm$^2$) | 150 | 150 | 150 | 150 | 165 | 150 | 165 | 150 | 150 |
| Primary resin layer | Resin composition | P2 | P2 | P1 | P1 | P1 | P1 | P1 | P1 | P1 |
| | Outer diameter (μm) | 202 | 185 | 185 | 202 | 202 | 185 | 185 | 185 | 185 |
| | Young's modulus (MPa) | 0.3 | 0.3 | 0.1 | 0.1 | 0.1 | 0.1 | 0.1 | 0.1 | 0.1 |
| Secondary resin layer | Tg(° C.) | 90 | 90 | 90 | 75 | 90 | 90 | 90 | 90 | 70 |
| Coating resin layer | Difference in linear expansion coefficient (×10$^{-4}$/° C.) | 0.3 | 0.3 | 0.3 | 0.3 | 0.3 | 0.1 | 0.6 | 0.6 | 0.3 |
| | Transmission characteristics at low temperature | B | A | A | A | B | A | B | B | A |
| | Lateral pressure characteristics | B | B | B | A | A | A | A | A | A |
| | Uniformity | B | A | B | A | B | A | A | A | A |

TABLE 2

| | | Comparative Example | | | | |
|---|---|---|---|---|---|---|
| | | 1 | 2 | 3 | 4 | 5 |
| | Effective core cross-sectional area (μm$^2$) | 150 | 150 | 150 | 150 | 150 |
| Primary resin layer | Resin composition | P2 | P2 | P3 | P1 | P1 |
| | Outer diameter (μm) | 180 | 205 | 185 | 202 | 200 |
| | Young's modulus (MPa) | 0.3 | 0.3 | 0.5 | 0.1 | 0.1 |
| Secondary resin layer | Tg(° C.) | 90 | 90 | 90 | 100 | 90 |
| Coating resin layer | Difference in linear expansion coefficient (×10$^{-4}$/° C.) | 0.3 | 0.3 | 0.3 | 0.3 | 0.8 |
| | Transmission characteristics at low temperature | A | B | A | C | C |
| | Lateral pressure characteristics | C | A | C | A | A |
| | Uniformity | A | C | A | B | B |

REFERENCE SIGNS LIST

10: Optical fiber, 11: Core, 12: Cladding, 13: Glass fiber, 14: Primary resin layer, 15: Secondary resin layer, 16: Coating resin layer

The invention claimed is:

1. An optical fiber comprising:
a glass fiber comprising a core and a cladding; and
a coating resin layer coating the glass fiber,
wherein the coating resin layer has a primary resin layer in contact with the glass fiber and coating the glass fiber and a secondary resin layer coating the outer periphery of the primary resin layer,
the primary resin layer has a Young's modulus of 0.4 MPa or less at 23° C. and the primary resin layer has an outer diameter of 185 μm or more and 202 μm or less,
the secondary resin layer has a glass transition temperature of 60° C. or more and 95° C. or less, and
a difference between an average linear expansion coefficient of the coating resin layer in the range of 60° C. to 140° C. and an average linear expansion coefficient of the coating resin layer in the range of −60° C. to 0° C. is $0.7 \times 10^{-4}$/° C. or less.

2. The optical fiber according to claim 1, wherein the primary resin layer comprises a cured product of a resin composition containing a urethane oligomer, a monomer and a photopolymerization initiator, and the resin composition contains 40 mass % or more of a one-end non-reactive oligomer based on the total amount of the urethane oligomer.

3. The optical fiber according to claim 1, wherein the glass fiber has an effective core cross-sectional area of 110 μm$^2$ or more and 170 μm$^2$ or less.

4. The optical fiber according to claim 3, wherein the primary resin layer has a Young's modulus at 23° C. of 0.3 MPa or less, and the glass fiber has an effective core cross-sectional area of 140 μm$^2$ or more and 170 μm$^2$ or less.

5. The optical fiber according to claim 1, further comprising a colored layer coating the outer periphery of the secondary resin layer.

6. The optical fiber according to claim 2, wherein the glass fiber has an effective core cross-sectional area of 110 μm$^2$ or more and 170 μm$^2$ or less.

7. The optical fiber according to claim 6, wherein the primary resin layer has a Young's modulus at 23° C. of 0.3 MPa or less, and the glass fiber has an effective core cross-sectional area of 140 μm$^2$ or more and 170 μm$^2$ or less.

8. The optical fiber according to claim 2, further comprising a colored layer coating the outer periphery of the secondary resin layer.

9. The optical fiber according to claim 3, further comprising a colored layer coating the outer periphery of the secondary resin layer.

10. The optical fiber according to claim 4, further comprising a colored layer coating the outer periphery of the secondary resin layer.

11. The optical fiber according to claim 6, further comprising a colored layer coating the outer periphery of the secondary resin layer.

12. The optical fiber according to claim 7, further comprising a colored layer coating the outer periphery of the secondary resin layer.

* * * * *